United States Patent
Hackney (10) Patent No.: US 12,227,961 B2
(45) Date of Patent: Feb. 18, 2025

(54) SKIMMER

(71) Applicant: Norma Hackney, Lee's Summit, MO (US)

(72) Inventor: Norma Hackney, Lee's Summit, MO (US)

(*) Notice: Subject to any disclaimer, the term of this patent is extended or adjusted under 35 U.S.C. 154(b) by 367 days.

(21) Appl. No.: 17/586,895

(22) Filed: Jan. 28, 2022

(65) Prior Publication Data

US 2023/0096073 A1 Mar. 30, 2023

Related U.S. Application Data (60) Provisional application No. 63/249,257, filed on Sep. 28, 2021.

(51) Int. Cl.
*E04H 4/12* (2006.01)
*B01D 35/02* (2006.01)
*C02F 1/40* (2023.01)
*E02B 15/10* (2006.01)

(52) U.S. Cl.
CPC ........... *E04H 4/1254* (2013.01); *B01D 35/02* (2013.01); *C02F 1/40* (2013.01); *E02B 15/10* (2013.01)

(58) Field of Classification Search
CPC ....... E04H 4/12; E04H 4/1209; E04H 4/1254; E04H 4/16; E04H 4/1609; C02F 1/40; C02F 2103/42; B01D 33/00; B01D 35/02; E02B 15/10
USPC ........ 210/774, 167.1, 167.18, 167.19, 167.2, 210/241
See application file for complete search history.

(56) References Cited

U.S. PATENT DOCUMENTS

| | | | | |
|---|---|---|---|---|
| 3,765,534 A | * | 10/1973 | West | E04H 4/1272 |
| | | | | 210/206 |
| 4,369,109 A | * | 1/1983 | Edge | B01D 29/96 |
| | | | | 210/462 |
| 6,270,683 B1 | * | 8/2001 | Turner | E04H 4/1254 |
| | | | | 210/167.2 |
| 10,012,003 B1 | * | 7/2018 | Des Champs | E04H 4/1254 |
| 10,676,948 B1 | * | 6/2020 | Nash, Sr. | E04H 4/1272 |

(Continued)

FOREIGN PATENT DOCUMENTS

| | | | | |
|---|---|---|---|---|
| BR | 112016002808 B1 | * | 3/2022 | ......... B01D 21/0012 |
| FR | 2979653 A1 | * | 3/2013 | ............... E04H 4/06 |

OTHER PUBLICATIONS

English translation of Legrand Patent Publication FR 2979653, published Mar. 2013. (Year: 2013).*

(Continued)

*Primary Examiner* — Joseph W Drodge
(74) *Attorney, Agent, or Firm* — Brennan, Manna & Diamond, LLC (57) ABSTRACT

The present invention relates generally to the field of recreational accessories. More specifically, the present invention relates to a water surface skimmer device that has a frame assembly with at least one horizontal frame member, at least one vertical frame member, at least one angled corner member, at least one T-shaped member and a net. In addition, a mounting assembly is provided having a base and at least one horizontal frame member. The device also includes a mounting assembly that may attach to a deck, concrete walkway, or side wall of the water feature. In this manner, the device can be applied to any water feature such that debris may be collected from the water's surface.

13 Claims, 6 Drawing Sheets

(56) References Cited

U.S. PATENT DOCUMENTS

| | | | | |
|---|---|---|---|---|
| 2002/0027097 A1* | 3/2002 | Baer | ............... | E04H 4/1254 |
| | | | | 210/167.19 |
| 2005/0087483 A1* | 4/2005 | Clay | ............... | E04H 4/1609 |
| | | | | 4/496 |
| 2010/0122949 A1* | 5/2010 | Van Der Meijden | .... | B25G 3/24 |
| | | | | 403/109.5 |
| 2013/0256203 A1* | 10/2013 | Schultz | ............ | E04H 4/1254 |
| | | | | 210/167.19 |
| 2014/0217010 A1* | 8/2014 | Fleury | ............ | E04H 4/1609 |
| | | | | 210/470 |
| 2014/0263031 A1* | 9/2014 | Lawson | ............ | B25G 1/00 |
| | | | | 56/400.01 |
| 2015/0125212 A1* | 5/2015 | Fischmann | ......... | E02B 15/06 |
| | | | | 405/63 |
| 2015/0267430 A1* | 9/2015 | Kemp | ............ | E04H 4/16 |
| | | | | 210/167.19 |
| 2016/0083971 A1* | 3/2016 | Greenfield | ........ | E04H 4/1609 |
| | | | | 210/470 |
| 2017/0215261 A1* | 7/2017 | Potucek | ............ | B25J 9/161 |
| 2017/0356210 A1* | 12/2017 | Kurani | ............ | B01D 35/02 |
| 2019/0010062 A1* | 1/2019 | Beech | ............ | G07C 3/12 |
| 2019/0323251 A1* | 10/2019 | Norberto, Jr. | ........ | B01D 35/157 |

OTHER PUBLICATIONS

English translation of Fishmann Patent Publication BR 112016002808, published Mar. 2022. (Year: 2022).*

* cited by examiner

SKIMMER

CROSS-REFERENCE TO RELATED APPLICATION

The present application claims priority to, and the benefit of, U.S. Provisional Application No. 63/249,257, which was filed on Sep. 28, 2021, and is incorporated herein by reference in its entirety.

FIELD OF THE INVENTION

The present invention relates generally to the field of accessories for recreational structures. More specifically, the present invention relates to a skimmer for use with swimming pools, spas, fountains and other water features that is comprised of a frame assembly having at least one horizontal frame member, at least one vertical frame member, at least one angled corner member, at least one T-shaped member and a net. In addition to a mounting assembly, the invention also includes a base and at least one horizontal frame member. The frame assembly of the device is preferably rectangular and flexible or semi-flexible, such that it can be customized to fit water features such as swimming pools of differing sizes and styles. The device also includes a mounting assembly that may attach or connect to a deck, concrete walkway, or side wall of a pool or water feature. In this manner, the device can be applied to any pool, spa, fountain or any water feature such that debris may be collected from the water's surface as the water circulates due to a pump or other directed flow. Accordingly, the present disclosure makes specific reference thereto. Nonetheless, it is to be appreciated that aspects of the present invention are also equally applicable to other like applications, devices and methods of manufacture.

BACKGROUND

Debris is a major problem for owners of water based recreational structures or other aesthetic features such as fountains, as it can dirty the water and clog filters of the water feature. Debris such as twigs, insects and leaves, often remains on the surface of the water, and creates an unsightly and undesirable appearance. However, handheld skimmers require an individual to manually skim the surface of the water to clean and remove debris from the surface of the water. At times, the individual may be unable to manually skim the surface of the water due to injuries, age, or simply being too busy with other activities of day-to-day life. If the surface of the water is not skimmed regularly, clogs may occur within the filtration system, potentially damaging expensive equipment such as the pump, and debris may accumulate in corners or other areas of the water feature which can lead to the development of bacteria and other issues. Fixing any broken equipment can be time-consuming and expensive, especially if the problem requires professional assistance.

Therefore, there exists a long-felt need in the art for an improved skimmer device. There also exists a long-felt need in the art for a water feature skimmer device that catches debris from the surface of the water as the water circulates from a pump or other directed flow, such as may occur with a fountain or stream. Further, there exists a long-felt need in the art for a water feature skimmer device capable of attaching to the area surrounding the water feature such as an in-ground pool and the wall or deck of an above-ground pool. In addition, there exists a long-felt need in the art for a skimmer device that can be easily disassembled and broken down for storage when not in use, such as during winter months, social gatherings or when it is simply undesirable to have the skimmer structure in view of the property owner or user of the water feature.

The subject matter disclosed and claimed herein, in one embodiment thereof, comprises a skimmer device for removing debris and other accumulated clutter. The device is comprised of a frame assembly having at least one horizontal frame member, at least one vertical frame member, at least one angled corner member, at least one T-shaped member and a net. In addition to a mounting assembly, the invention includes a base and at least one horizontal frame member. The frame assembly of the invention has a geometric or other fanciful shape and in one embodiment is rectangular in shape. The frame is flexible or semi-flexible such that it can be modified by the user to fit water features, structures and pools of differing sizes and styles. The device also includes a mounting assembly that may attach to a deck, concrete walkway, or side wall of a pool. In this manner, the device can be applied to any water feature, structure or pool such that debris and other material may be collected from the water's surface as it circulates or moves in connection with a flow direction.

In this manner, the water surface skimmer device of the present invention accomplishes all the forgoing objectives and provides an improved means of cleaning debris and other material from the surface of water. Further, the device may attach to a concrete walk, deck or side of the pool, remaining in a stationary position to catch debris or other material from its surface. In addition, the invention may easily be disassembled and broken down for storage when not in use.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a water surface skimmer device. The invention is comprised of a frame assembly having at least one horizontal frame member, at least one vertical frame member, at least one angled corner member, at least one T-shaped member, and a net, mesh, fabric or other flexible material that can be used for collection of material or debris. In addition to a mounting assembly a base and at least one horizontal frame member. In differing embodiments, the frame assembly may have the appearance of a plurality of differing shapes. However, in the preferred embodiment, the frame assembly resembles a geometric shape such as a generally rectangular shape. The frame assembly may also be made of a plurality of materials that may commonly be used for making recreational accessories. However, the body is preferably made of a flexible or semi-flexible plastic material, such as polyethylene, PVC, polypropylene or other plastic. The frame members are tubular and have a diameter ranging from ⅛" to 2".

The frame assembly in another embodiment has at least one horizontal frame member and at least one vertical frame member. To connect the horizontal and vertical frame members, at least one angled corner member or at least one T-shaped member may be used. The angled corner member may connect one horizontal frame member to one vertical frame member. The T-shaped member may connect three or more frame members, either two or more horizontal frame members and one vertical frame member or two or more vertical frame members and one horizontal frame member. A net, mesh, flexible material or fabric is attached to the frame assembly such that as the water circulates in the water area, debris or other material on the surface of the water gets caught in the net to be disposed of later. Preferably, the material is a polyester or nylon mesh, netting, fabric or flexible material with a weight ranging from between 2 to about 4.5 ounces per yard of material and preferably between 2.24 and 4.18 ounces per yard. Each of the material types will allow water to pass through and prevent debris from coming through. The mesh netting ranges from 12 holes per inch to 40 holes per inch.

A horizontal frame member extends from a T-shaped member of the frame assembly and connects at its other end to a mounting assembly. The mounting assembly may be used to secure the device to the structure around the water feature. The mounting assembly includes a base, having a male protrusion that inserts into the spaces between the planks of the surrounding structure such as deck to secure the device in place. The bottom surface of the base contacts the structure or deck, providing additional support for the device. The base further includes a continuous opening in which the horizontal frame member is inserted. The base may be fixedly attached to the horizontal frame member, or the base may be removably attached such that the length between the frame assembly and mounting assembly may be adjusted. To fix the base to the horizontal frame member, a threaded rod may be inserted into the top surface of the base and compresses the portion of the horizontal frame member that is in the continuous opening of the base.

In one potential embodiment, the mounting assembly may attach to the side wall of the water feature such as an above-ground pool. In this embodiment, the horizontal frame member is still attached to the base of the mounting assembly by being compressed by a threaded rod in the continuous opening of the base. However, the male protrusions extend farther to contact more surface area on both the inside and outside surfaces of the side wall of the water feature. At least one additional threaded rod may inserted into one of the male protrusions of the base to compress the base to the side wall of the pool and secures it in place. A padding, such as a rubber, neoprene, silicone or other soft and deformable material may be attached to the inside surfaces of the male protrusions, such that the liner of the pool or water feature is not damaged.

Accordingly, the skimmer device of the present invention is particularly advantageous as it provides an improved means of cleaning debris from the surface of the water. Further, the device may be easily disassembled and broken down for storage when not in use, such as winter months or when the owner does not want the invention to be in sight. In addition, the device may attach to any structure surrounding a water feature or pool such as a concrete walkway or pad, deck, rocks, or side wall of the water feature such as a pool so that the debris or material may be efficiently collected from the surface of the water as it circulates. In this manner, the skimmer device overcomes the limitations of existing skimmer devices known in the art.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for an improved skimmer device for clearing water surfaces. There also exists a long-felt need in the art for a stationary skimmer that catches debris and other material from the surface of the water as the water circulates naturally or from directive force of a pump. Further, there exists a long-felt need in the art for a water feature skimmer device capable of attaching to a surrounding structure such as a concrete walk or deck area surrounding an in-ground pool or water fountain and the wall or deck of an above-ground pool or spa. In addition, there exists a long-felt need in the art for a skimmer device that can be easily disassembled and broken down for storage when not in use, such as during winter months, social activities or when an owner does not want the invention to be in sight or use.

The present invention, in one exemplary embodiment, is comprised of a skimmer device capable of being secured to a water feature structure such as a pool, spa, fountain or the like such that debris on top of the water surface gets captured in the device as the water circulates around the surface of the water feature such as a pool, spa, fountain or the like. The device includes a frame assembly that has at least one horizontal frame member, at least one vertical frame member, at least one angled corner member, at least one T-shaped member and a net mesh or other fabric or material. Preferably, the material is a polyester or nylon mesh with a weight ranging from between 2 to about 4.5 ounces per yard of material and preferably between 2.24 and 4.18 ounces per yard. In addition to a mounting assembly, a base and at least one horizontal frame member is provided. In differing embodiments, the frame assembly may have the appearance of a plurality of differing shapes, and in the preferred embodiment the frame assembly has a generally rectangular, quadrate or square shape. In another embodiment the shape may be triangular, such as an isosceles triangle, which allows a large contact area with the water surface and minimizes the area of the area of the device above the water surface. The frame assembly may also be made of a plurality of materials that may commonly be used for making recreational accessories but is preferably made of a flexible or semi-flexible plastic material such as polyethylene, PVC, polypropylene, or other plastic. The frame members are tubular and have a diameter ranging from ⅛" to 2". In addition, any surface of the device may be comprised of a plurality of indicia such as patterns, logos, emblems, images, symbols, designs, letters, words, characters, animals, advertisements, brands, etc. that may or may not be music or musician related.

Further, the frame assembly of the device may have at least one or more horizontal frame members and at least one vertical frame members that give the device a geometric shape such as a generally rectangular, quadrate or square shape. The horizontal and vertical frame members may be connected by at least one angled corner member or at least one T-shaped member. The angled corner member can be used to join one horizontal frame member to one vertical frame member, forming a corner of the overall shape of the frame assembly. The T-shaped member can be used to join one vertical frame member and two horizontal frame members, or one horizontal frame member and two vertical frame members, potentially splitting the device into sections or aiding in support. All members of the frame assembly are preferably made of a hollow tube material, such as PVC pipes, but may be made of any material such that the device is customizable to be used in recreational activities of varying shapes and sizes. In addition, a net may fixedly or removably attach to the frame assembly to catch debris or other material that has collected on and is circulating on the water's surface.

A mounting assembly may be used to secure the device in place. In one embodiment, the mounting assembly may secure the device to a structure such as a wooden deck surrounding an above-ground pool. The mounting assembly has a base, with male protrusions to secure the device to the deck. A deck is commonly made of long planks of wood with small spaces in between each plank of the deck. The male protrusions of the base of the mounting assembly insert into the spaces between the planks of wood of the deck, locking the device in place on the deck and adjacent to the pool and water surface. The bottom surface of the base then contacts the deck, providing additional support for the mounting assembly. The planks of wood used in constructing the deck may be made of various widths. Thus, the male protrusions of the base may be spaced at varying lengths in differing embodiments to accommodate different deck styles and construction features. Fasteners may also be used to secure the structure or base to the deck of an above-ground pool or a concrete walkway or pad surrounding an in-ground pool or other water feature.

A continuous opening of the base of the mounting assembly allows the mounting assembly to attach to at least one horizontal frame member. In one potential embodiment, the base is fixedly attached to the horizontal frame member and cannot move or be adjusted in length. In another potential embodiment, the base may move along the axial direction of the horizontal frame member to fit the requirements of the installation location. To fix the position of the base on the horizontal frame member, at least one threaded rod may insert into female threads on the top surface of the base. A handle on the top of the threaded rod may be twisted to push the rod further into the base, compressing the horizontal frame member in place. The horizontal frame member connects the mounting assembly to the frame assembly by inserting one end into a T-shaped member on one side of the frame assembly. The other end of the horizontal frame member inserts through the continuous opening of the mounting assembly and is secured using the threaded rod and handle on the top surface of the base.

The mounting assembly may also be used to attach to the surrounding structure to the water feature, such as the side wall of an above-ground pool. In this potential embodiment, the male protrusions may extend farther from the base, contacting more surface area on both the inside wall and outside wall of the pool. A threaded rod may be able to be inserted into female threads on at least one of the male protrusions. A handle on the top of the threaded rod may aid the user in tightening the mounting assembly and securing it to the side of the surrounding structure such as a pool, spa, water fountain or other water feature. In order to avoid damaging the liner on the inside wall of the pool, spa or other water feature, or the material on the outside wall of the pool or water feature, a padding may be fixedly attached to the inside surfaces of the male protrusions. The padding may include rubber, neoprene silicone, polyurethane foam or other deformable material. The deformable material has a thickness ranging from ½" to 2". Similar to mounting the device to a deck, a horizontal frame member is connected to a T-shaped member of the frame assembly and extends outwardly and passes through a continuous opening on the base of the mounting assembly. A threaded rod and handle may still be applicable on the top surface of the base to secure the mounting assembly to the horizontal frame member in the embodiment in which the mounting assembly is not fixedly attached to the horizontal frame member.

Accordingly, the water feature skimmer device of the present invention is particularly advantageous as it provides an improved means of cleaning debris from the surface of the water. Further, the device may attach and anchor to any side wall of the structure surrounding the pool or water feature, such as any deck, or any concrete walkway or pad surrounding the pool or water fountain such that the device may remain stationary in the pool, collecting debris or other material floating on the water's surface. In addition, the device may easily be disassembled and condensed to allow easy storage for times when the device may not need to be in use. In this manner, the skimmer device overcomes the limitations of existing skimmer devices known in the art.

Figure 1:
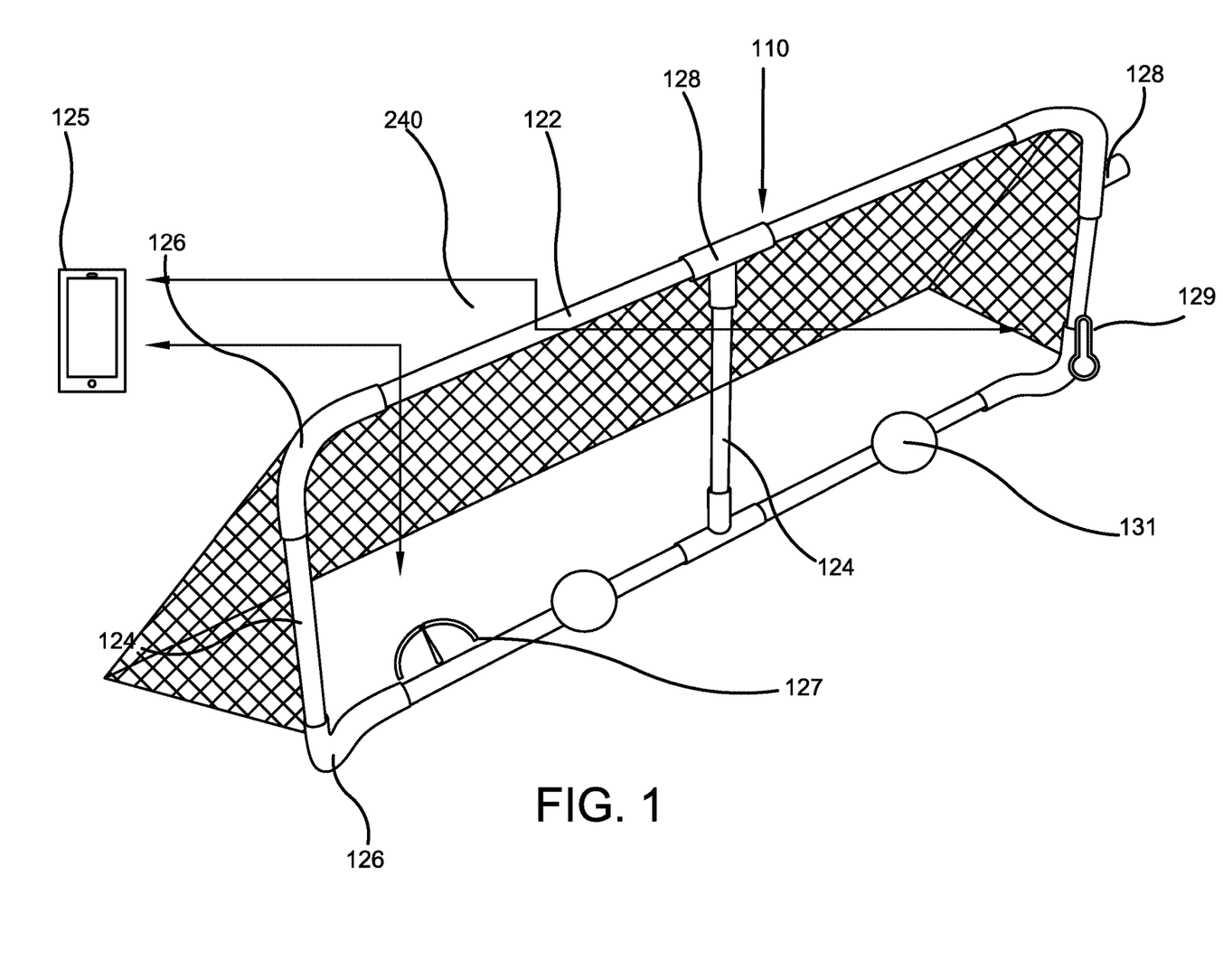
FIG. 1 illustrates a perspective view of one potential embodiment of a skimmer device of the present invention in accordance with the disclosed architecture.

Referring initially to the drawings, FIG. 1 illustrates a perspective view of one potential embodiment of a skimmer device 100 of the present invention in accordance with the disclosed specifications. The device 100 includes a frame assembly 120 having at least one horizontal frame member 122, at least one vertical frame member 124, at least one angled corner member 126, at least one T-shaped member 128, and a net, mesh or fabric 240. Preferably, the material is a polyester or nylon mesh with a weight ranging from between 2 to about 4.5 ounces per yard of material, and preferably between 2.24 and 4.18 ounces per yard. In addition to a mounting assembly 200 the invention includes a base 210 and at least one horizontal frame member 220. In differing embodiments, the frame assembly 120 may have the appearance of a plurality of differing shapes such as but not limited to: a square, a rectangle, a triangle, a circle, an oval, a pentagon, a hexagon, an ellipse, etc. Further, the frame assembly 120 may be made of a plurality of waterproof materials such as metal, but is preferably made of a flexible or semi-flexible plastic such as, but not limited to, an acrylic, polycarbonate, polyethylene, thermoplastic, acrylonitrile butadiene styrene, low density polyethylene, medium density polyethylene, high density polyethylene, polyethylene terephthalate, polyvinyl chloride, polystyrene, polylactic acid, acetal, nylon, fiberglass, or combinations thereof. In addition, the frame assembly 120 may be transparent, semi-transparent or opaque in differing embodiments.

The frame assembly 120 of the device 100 preferably resembles a generally rectangular shape. The frame assembly 120 includes at least one horizontal frame member 122 and at least one vertical frame member 124. The horizontal frame members 122 and vertical frame members 124 may be connected via at least one angled corner member 126, or at least one T-shaped member 128. The corner member 126 may connect one horizontal frame member 122 to one vertical frame member 124, forming a generally perpendicular assembly. The T-shaped member 128 may connect 3 members 122, 124. The T-shaped member 128 may connect two horizontal frame members 122 aligned axially to one vertical frame member 124 aligned generally perpendicular to the two horizontal frame members 122. In addition, the T-shaped member 128 may connect two vertical frame members 124 aligned axially to one horizontal frame member 122 aligned generally perpendicular to the two vertical frame members 124. The horizontal and vertical frame members 122, 124 are preferably hollow, to reduce the overall weight of the device 100, and made from a tubular pipe and decrease the moment arm on the mounting assembly 200, and increase the buoyancy of the frame assembly 120. The hollow frame members may also be filled with a polyurethane frame to increase floatation of the device. In differing embodiments, the frame assembly 120 may have differing levels of buoyancy to allow the frame assembly 120 to be fully submerged, partially submerged or to float within a pool 20. The frame assembly 120 may be provided with weights or floats 131.

Figure 5:
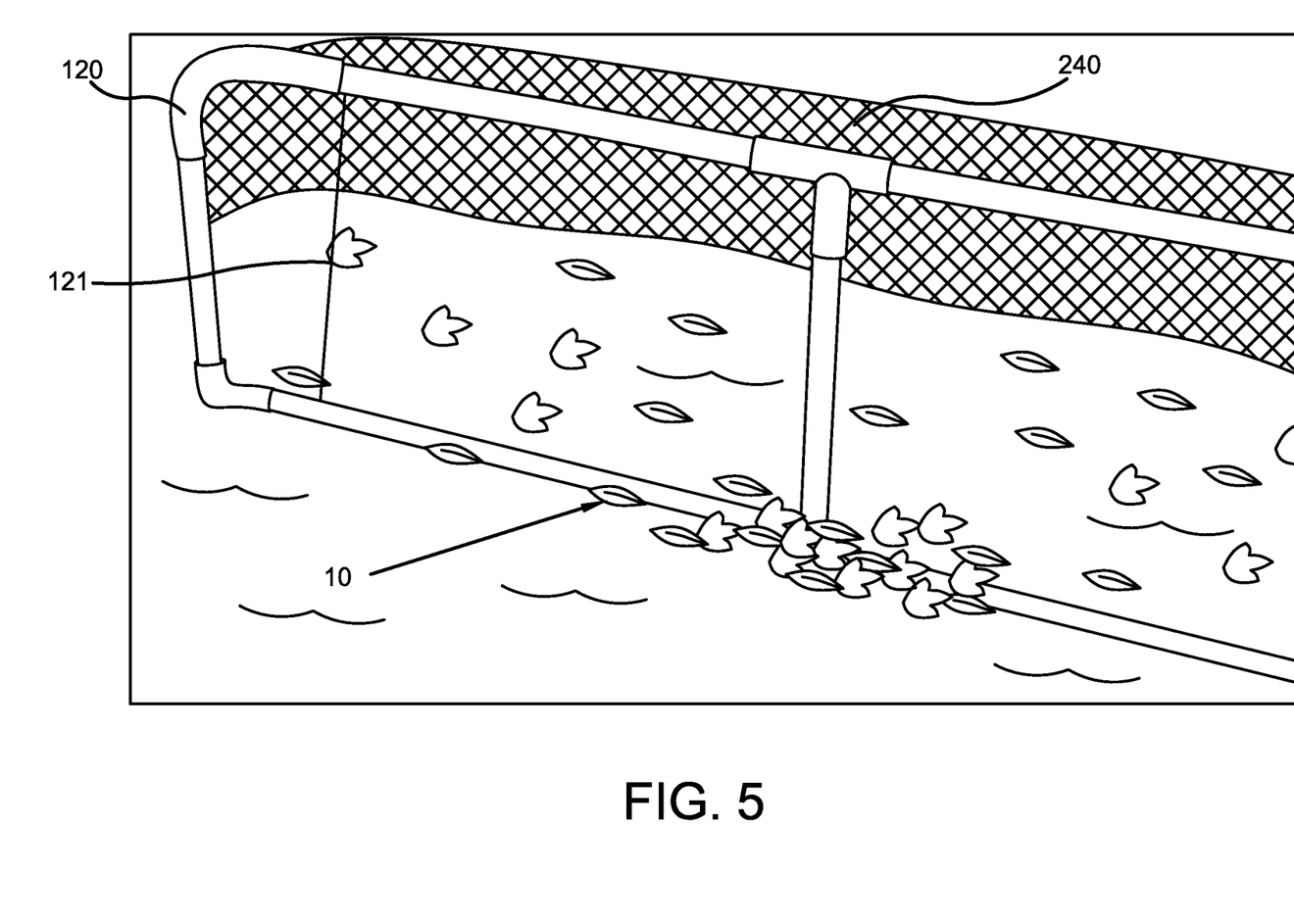
FIG. 5 illustrates an enhanced perspective view of one potential embodiment of a skimmer device of the present invention while attached to a side wall of an above-ground water feature such as pool in accordance with the disclosed architecture.

In one potential embodiment, the device 100 may have extra horizontal and vertical frame members 122, 124, as well as additional angled corner members 126 and T-shaped members 128, allowing the frame assembly 120 to be customized by the user to fit a plurality of pool 20 sizes and styles. A net, mesh or fabric 240 further fixedly or removably attaches to the frame assembly 120 to catch debris and other material 10 circulating on the surface of the water 20 (as best seen in FIG. 5). The net 240 may be taut or loose and can be made from any materials commonly used for manufacturing nets such as, but not limited to, cotton, hemp, flax, manila, sisal, metal, nylon, polyester, polypropylene, polyethylene, mesh, etc. The frame assembly 120 may also include a thermometer 129 so that the owner of the water feature can see the temperature of the water, and a sensor 127 for detecting chorine and other chemicals in the pool. Each of the sensor and thermometer may be connected to a smartphone 125 which has a previously downloaded software application allowing the user to remotely see the temperature and chemical level of the water.

Figure 2:
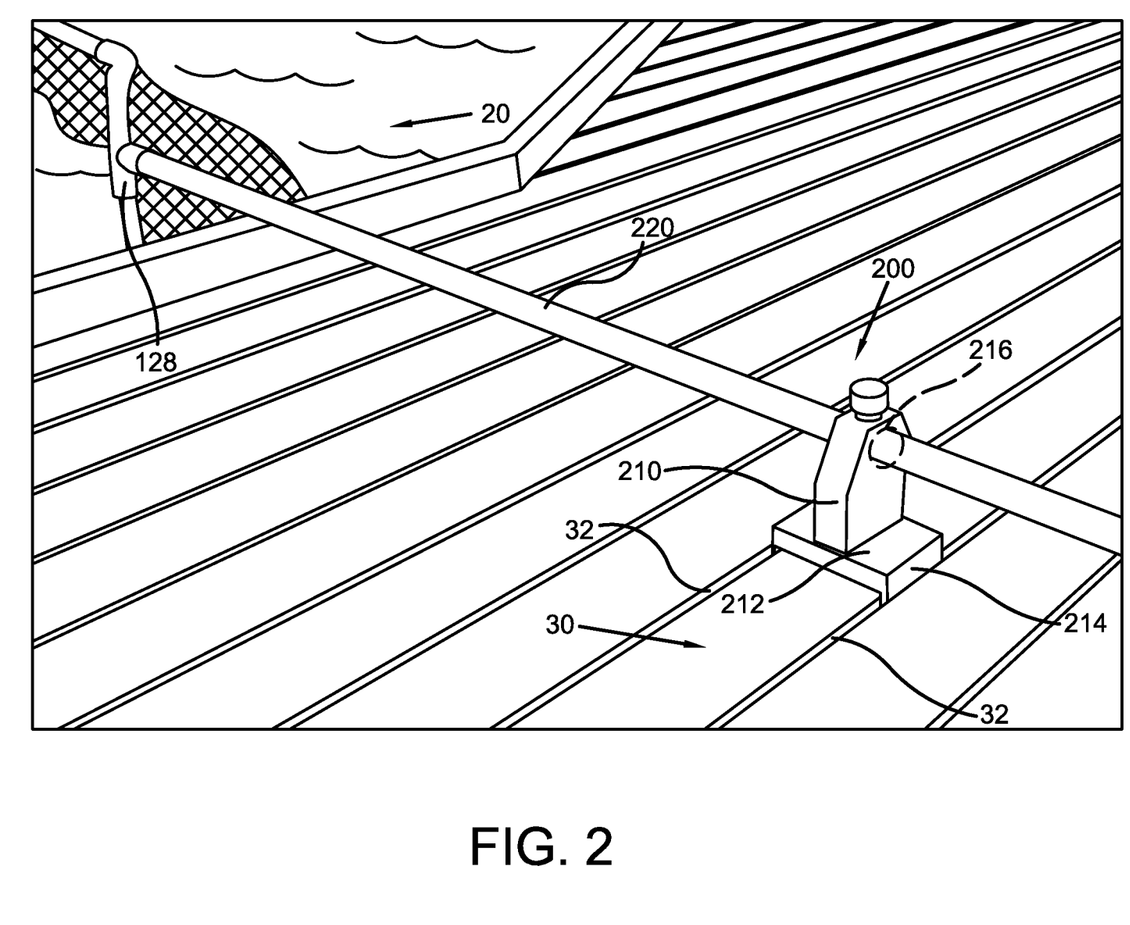
FIG. 2 illustrates a perspective view of one potential embodiment of a skimmer device of the present invention while attached to a deck in accordance with the disclosed architecture.

FIG. 2 illustrates a perspective view of one potential embodiment of a skimmer device 100 of the present invention while attached to a wooden or similar material deck 30 in accordance with the disclosed specification. A mounting assembly 200 may be used to secure the device 100 to a deck 30 or other structure or fixture that is near the water feature such that it is in a fixed, unmoving position. The mounting assembly 200 includes a base 210, which has at least one male protrusion 214 and at least one continuous opening 216. The male protrusions 214 extend downward and away from the base 210, giving the base 210 the appearance of being generally U-shaped. The protrusions then fit within the spaces 32 between each plank of a deck 30. In differing embodiments, the width of the base 210, and thus the male protrusions 214, may be varied to accommodate different widths of the planks used to construct various sizes, types and styles of decks 30 or other structures to which the device 100 can be secured. The base 210 has a bottom surface 212 that contacts the top surface of the deck 30 and provides additional support for the mounting assembly 200. The bottom surface 212 of the base 210 may be made of a non-slip material, such as rubber, to further secure the device 100 in place. In addition, at least one fastener 250 may be used to provide additional support and stability to the device 100. The fasteners 250 may be used to secure or adhere to the deck or structure 30 of an above-ground pool 20 or a concrete walkway or pad of an in-ground pool 20 or other structure that may be adjacent to a water feature or spa. The fasteners 250 may be any fasteners known in the art such as, but not limited to, a screw, a bolt, a nail, a magnet, a hook-and-loop fastener, concrete anchors, etc.

The continuous opening 216 of the base 210 accepts an at least one horizontal frame member 220 and, at each end, attaches to the mounting assembly 200 and to the frame assembly 120, respectively. In one potential embodiment, the base 210 is fixedly attached to the horizontal frame member 220 at a fixed and unchanging length away from the frame assembly 120. In another potential embodiment, the base 210 is removably attached to the horizontal frame member 220 and may move axially along the horizontal frame member 220 to adjust the distance between the mounting assembly 200 and the frame assembly 120. In order to fix the position of the base 210 on the horizontal frame member 220, at least one threaded rod 230 may be inserted into female threads on the top surface 215 of the base 210. The threaded rod 230 is comprised of a handle 232 at its top that, when twisted or turned, pushes the threaded rod 230 into the continuous opening 216 of the base 210, compressing against the horizontal frame member 220 and locking the member 220 in place. At its opposite end, the horizontal frame member 220 is attached to two vertical frame members 124 of the frame assembly 120 via a T-shaped member 128. The horizontal frame member 220 of the mounting assembly 200 may be fixedly or removably attached to the frame assembly 120.

Figure 3:
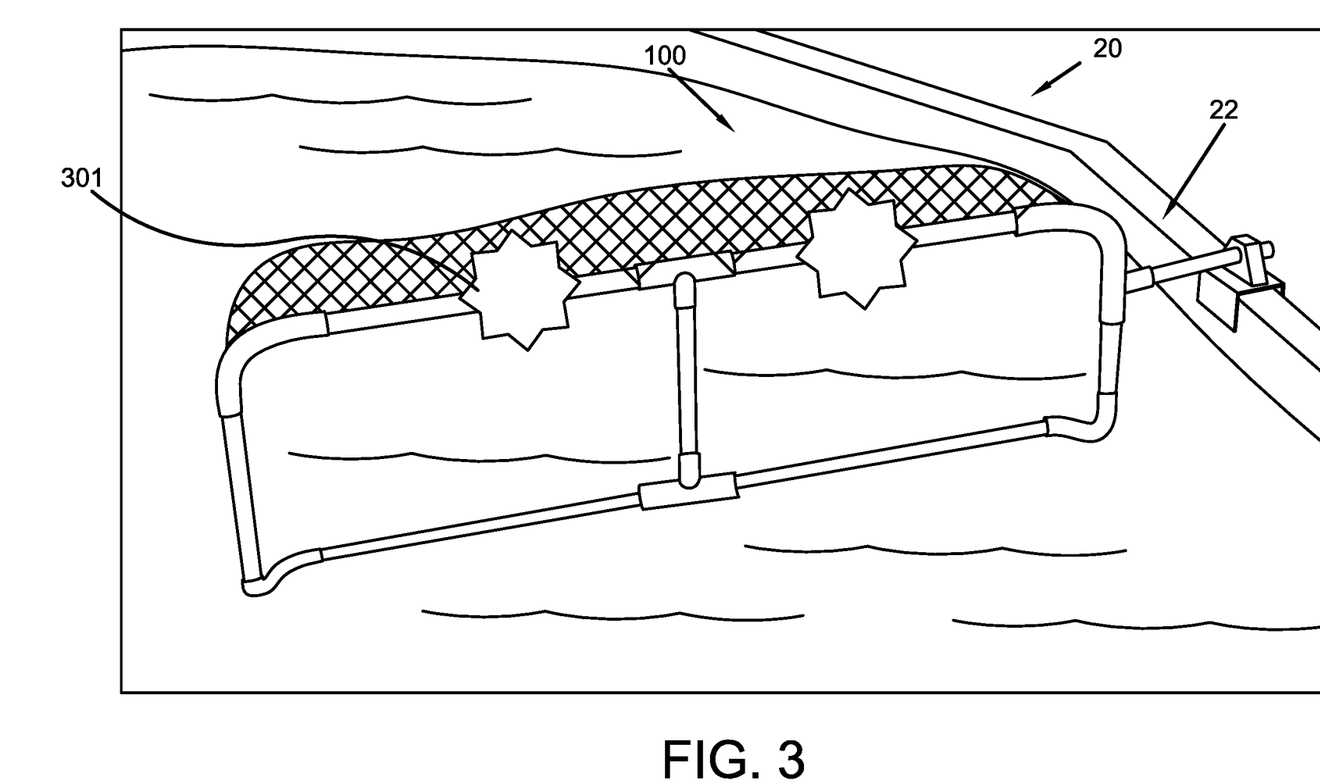
FIG. 3 illustrates a perspective view of one potential embodiment of a skimmer device of the present invention while attached to a side wall of an above-ground water feature such as a pool in accordance with the disclosed architecture.
Figure 4:
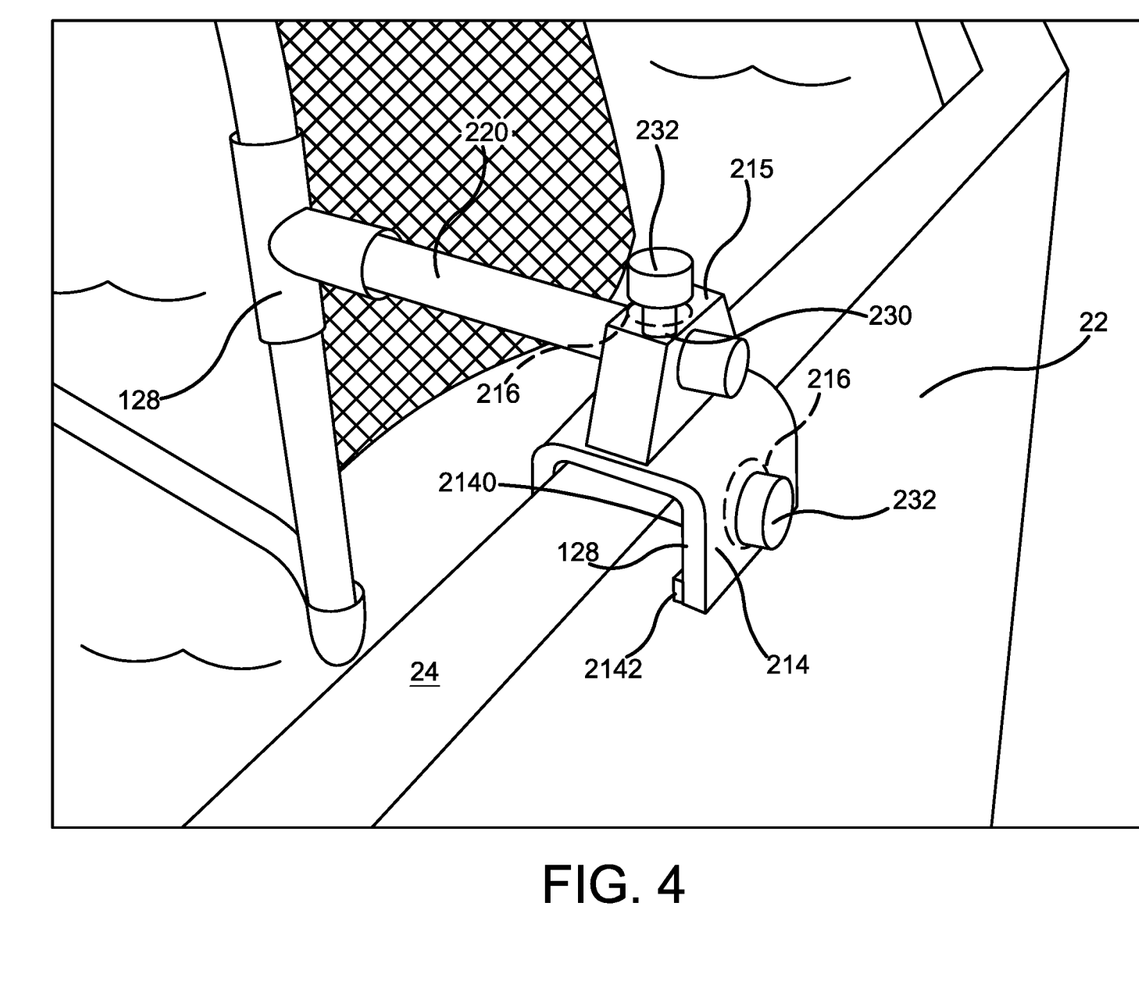
FIG. 4 illustrates an enhanced perspective view of one potential embodiment of a skimmer device of the present invention while attached to a side wall of an above-ground water feature in accordance with the disclosed architecture.

FIG. 3 illustrates a perspective view of one potential embodiment of a water feature skimmer device 100 of the present invention while attached to a side wall 22 of an above-ground pool 20 in accordance with the disclosed specification. In one potential embodiment, the mounting assembly 200 attaches to the side wall 22 of an above-ground pool 20 rather than to a deck 30. In this potential embodiment, the male protrusions 214 may extend farther from the base 210, contacting more surface area on both the inside and outside portions of the side wall 22 of the pool 20. The inside surfaces 2140 of the male protrusions 214 may have a padding 2142 that prevents the side wall 22 of the pool 20 from being damaged. The padding 2142 may be of any material such that it does not easily degrade in pool water and is not damaging to the liner of the pool 20. Padding may be rubber, silicone, neoprene or other soft and deformable material and have a thickness ranging from between ½" to 2 inches. As best seen in FIG. 4, at least one additional threaded rod 230 may aid in securing the mounting assembly 200 to the side wall 22 of the water feature 20 by inserting into female threads on at least one of the male protrusions. Preferably, one additional threaded rod is attached to the male protrusion 214 on the outside of the water feature 20. As mentioned supra, the horizontal frame member 220 connects the frame assembly 120 to the mounting assembly 200 via a T-shaped member 128 on one end and by passing through the continuous opening 216 of the base 210 on its other end. In this embodiment, the horizontal frame member 220 may be of a shorter length so as to not extend out past the boundary of the water feature 20. FIG. 3 also shows the use of graphics, indicia or other personalization materials 301 to allow the user to decorate the frame assembly 120.

FIG. 5 shows the frame 120 having the net 240 extending outward frame so as to allow the debris to collect in the net 240 and not accumulate at the frame. In this way, the net 240 creates a bag that when the frame is removed, the net captures the debris 10. The area occupied net 240 is larger than the frame opening 121 by 2 to 4 times so as to create a bag and capture the debris 10.

Figure 6:
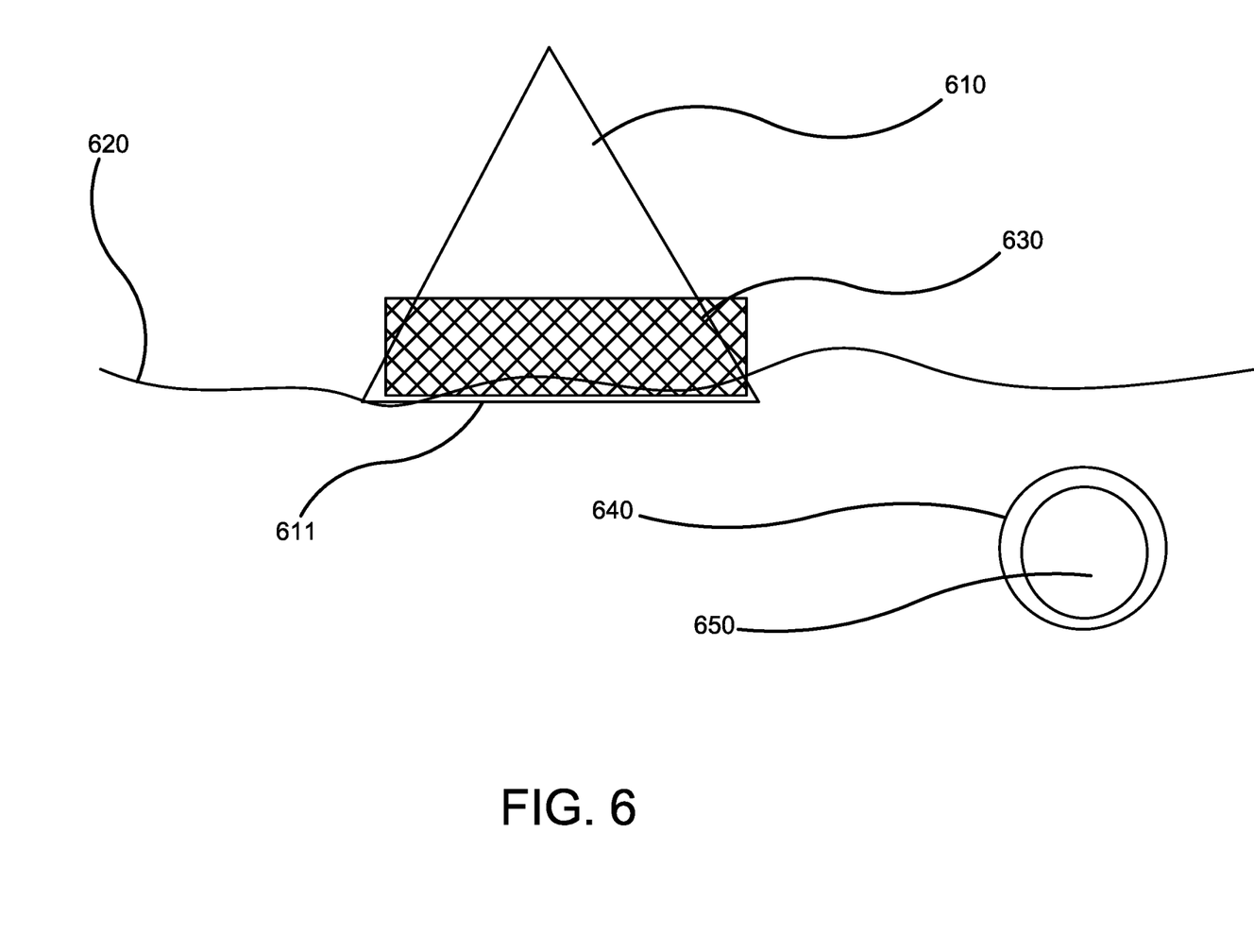
FIG. 6 illustrates a perspective view of an alternate embodiment of the skimmer device of the present invention in accordance with the disclosed architecture.

FIG. 6 shows a further embodiment of the present invention in which the frame 610 is in a triangle shape and as shown an isosceles triangle. One side or the base of the triangle 611 is in contact with the or slightly below the water line 620. A net 630 is then at or below the water line 620. In this way, the frame 610 has a maximum surface area at the water line and then a reduced profile of the frame is above the water line. Also shown in FIG. 6 is a cross section of the tubular construction of a frame member 640 showing a polyurethane foam 650 inside the frame member to add additional buoyancy.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "skimmer device" and "device" are interchangeable and refer to the skimmer device 100 of the present invention. The term "water feature" is generally used to describe a structure capable of holding water for recreational or aesthetic purposes, for example a swimming pool, spa, lap pool, fountain, or the like.

Notwithstanding the forgoing, the pool skimmer device 100 of the present invention and its various components can be of any suitable size and configuration as is known in the art without affecting the overall concept of the invention, provided that they accomplish the above-stated objectives. One of ordinary skill in the art will appreciate that the size, configuration and material of the skimmer device 100 as shown in the FIGS. are for illustrative purposes only, and that many other sizes and shapes of the skimmer device 100 are well within the scope of the present disclosure. Although the dimensions of the skimmer device 100 are important design parameters for user convenience, the skimmer device 100 may be of any size, shape and/or configuration that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A skimmer for a water feature, the skimmer comprising:
    a frame having a horizontal base member and at least two vertical members extending upwardly from the horizontal base member, wherein the frame creates an opening, and further wherein the horizontal base member and at least two vertical members are connected to one another and each comprised of a tubular material;
    a net connected to each of the horizontal base member and the at least two vertical members, wherein the net is 2 to 4 times larger than the opening of the frame; and
    a mounting assembly comprising a U-shaped base comprising a continuous opening, and a pair of downwardly extending male protrusions configured to engage a deck plank; and
    wherein a bottom surface of the base comprises a non-slip material.

2. The skimmer for a water feature as recited in claim 1, wherein the water feature is one of a swimming pool, a spa, a swim spa or a fountain.

3. The skimmer for a water feature as recited in claim 1, wherein the net is comprised of a polyester or a nylon mesh having a weight ranging from between 2 to about 4.5 ounces per yard of material.

4. The skimmer for a water feature as recited in claim 1, wherein the net comprises a plurality of openings therein that ranges from 12 openings per inch to 40 openings per inch.

5. The skimmer for a water feature as recited in claim 1, wherein the net is comprised of a weight of between 2.24 and 4.18 ounces per yard.

6. The skimmer for a water feature as recited in claim 1, wherein the tubular material is filled with a polyurethane foam.

7. The skimmer for a water feature as recited in claim 1 further comprising a thermometer and a sensor disposed on the frame.

8. The skimmer for a water feature as recited in claim 7, wherein the sensor detects a presence of a chemical in the water feature.

9. A pool skimmer comprising:
- a tubular frame having at least two horizontal members and at least two vertical members forming one of a rectangle, a square or a quadrate shape, wherein the tubular frame forms an opening;
- a net connected to the tubular frame, wherein the net comprises an area that is larger than the opening; and
- a mounting assembly comprises a U-shaped support base for connecting the tubular frame to a structure adjacent a pool, wherein the U-shaped support base comprises a threaded continuous opening and a pair of downwardly extending male protrusions configured to engage a deck plank; and
- wherein each downwardly extending male protrusion comprises a deformable padding on an inside facing surface;
- wherein the tubular frame further comprises a float positioned along at least one of the at least two horizontal members.

10. The pool skimmer as recited in claim 9, wherein the tubular frame is filled with a polyurethane foam to improve buoyancy.

11. The pool skimmer as recited in claim 9, wherein the net is comprised of a mesh, a netting or a flexible fabric having a plurality of openings therein that range from 12 openings per inch to 40 openings per inch.

12. The pool skimmer as recited in claim 9 further comprising a thermometer and a chemical sensor attached to the tubular frame, wherein the thermometer and the chemical sensor are accessible via a smartphone.

13. A water surface skimmer comprising:
- a frame constructed from a plurality of tubular frame members, the frame forming an opening;
- a net connected to the frame, wherein the net comprises an area greater than the opening of the frame and is a polyester or nylon mesh having a weight ranging from 2 to about 4.5 ounces per yard of material; and
- a mounting assembly for connecting the frame to a structure for holding a quantity of water, the mounting assembly being adjustable to attach to different sizes of structure; and
- wherein the mounting assembly comprises a U-shaped base comprising a continuous opening, a pair of downwardly extending male protrusions configured to engage a sidewall of a water feature and at least one threaded rod configured to secure the mounting assembly.

* * * * *